United States Patent [19]
Nakanishi et al.

[11] 3,748,056
[45] July 24, 1973

[54] TURBINE BLADE COOLING

[75] Inventors: Keiichi Nakanishi, Ohta-ku, Tokyo; Noritoshi Handa, Kanazawa-ku, Yokohama, both of Japan

[73] Assignee: Nissan Motor Company, Limited, Yokohama City, Japan

[22] Filed: Dec. 22, 1971

[21] Appl. No.: 210,810

[30] Foreign Application Priority Data

Feb. 9, 1971 Japan..............................46/5160
Feb. 18, 1971 Japan..............................46/9154

[52] U.S. Cl. .............................................. 415/115
[51] Int. Cl. ............................................. F01d 5/14
[58] Field of Search ........................... 415/115, 116; 416/95, 96

[56] References Cited
UNITED STATES PATENTS

| 3,437,313 | 4/1969 | Moore | 416/95 |
| 2,680,001 | 6/1954 | Batt | 415/115 |
| 2,973,937 | 3/1961 | Wolf | 416/95 |
| 3,043,561 | 7/1962 | Scheper, Jr. | 415/115 |
| 3,451,215 | 6/1969 | Barr | 415/115 |
| 3,437,313 | 4/1969 | Moore | 415/115 |

FOREIGN PATENTS OR APPLICATIONS

| 603,798 | 6/1948 | Great Britain | 415/115 |
| 736,503 | 9/1955 | Great Britain | 415/115 |

Primary Examiner—C. J. Husar
Attorney—John Lezdey

[57] ABSTRACT

A cooling system for the turbine wheel and blade assembly of a gas turbine engine, which system comprising a cooling air flow passage provided on the turbine wheel and blade assembly at one of the external surfaces thereof. The cooling air flow passage is comprised of a cooling air inlet formed in a sationary part of the gas turbine engine, an intermediate passage defined between the side wall of the turbine wheel and the adjacent side wall of the stationary part or stator body of the gas turbine engine, and an ejector portion defined between the circumferential edge of the turbine wheel and the adjacent edge of the stationary part of the gas turbine engine which ejector portion opens to a high temperature gas flow passage in which the turbine blades are operatively disposed at the base portion of the turbine blade. The turbine wheel and blade assembly is also provided with an additional cooling air flow passage at another one of the external surfaces thereof. The additional cooling air flow passage is comprised of a cooling air inlet formed in a rotational shaft driven by the turbine wheel, an intermediate passage defined between another side wall of the turbine wheel and adjacent side wall of another stationary part of the gas turbine engine, and an ejector portion defined between another circumferential edge of the turbine wheel and the adjacent edge of another stationary part of the gas turbine engine which ejector portion opens to the high-temperature gas flow passage at the opposing side of the base portion of the turbine blades.

1 Claim, 5 Drawing Figures

Patented July 24, 1973  3,748,056

INVENTORS
KEIICHI NAKANISHI +
NORITOSHI HANDA,
BY John Legally
ATTORNEY

INVENTORS
KEIICHI NAKANISHI +
NORITOSHI HANDA
BY
ATTORNEY

TURBINE BLADE COOLING

This invention relates to gas turbine engines and, more particularly, to a cooling system for the turbine wheel and blade assembly of the gas turbine engine driven by a high-temperature flow of gases from a combustion chamber.

As is well known in the art, gas turbine engines are comprised of a gas generator section consisting primarily of an air compressor, a combustion chamber portion and a compressor turbine wheel which obtains its energy from the gases flowing out of the combustion chamber portion and drives the compressor. The gases flowing out of the compressor turbine pass into fixed guide nozzle blades from which the gases are caused to impinge upon the turbine blades to drive the turbine wheel. Under this circumstance, the turbine wheel and blades of the gas turbine engine are subjected to not only the high temperatures but also the great centrifugal forces due to its high rotational speeds resulting in the increased deterioration and reduction in operating life of the turbine wheel and blade assembly.

It is, therefore, an object of this invention to provide a new and improved cooling system for the turbine wheel and blade assembly of a gas turbine engine.

Another object of this invention is to provide an improved external cooling system for the turbine wheel and blade assembly of a gas turbine engine whereby the durability of the gas turbine engine is increased.

A further object of this invention is to provide an improved cooling system adapted for cooling the external surface of the turbine wheel and blade assembly of a gas turbine engine, which effectively utilized the cooling air to prevent reduction in strength characteristics of the exposed turbine wheel and blade surfaces.

A still further object of this invention is to provide an improved external cooling system for the turbine wheel and blade assembly of a gas turbine engine, which system is simplified in construction and economical to manufacture.

In general, these and other objects and features of the present invention will be attained in a cooling system wherein a cooling air is introduced to the external surfaces of the turbine wheel and blade assembly of a gas turbine engine. In one embodiment of the present invention, a cooling air flow passage is provided on the turbine wheel and blade assembly at one of the external surfaces thereof. The cooling air flow passage is comprised of a cooling air inlet formed in a stationary part of the gas turbine engine, an intermediate passage defined between the side wall of the turbine wheel and the adjacent side wall of the stationary part or stator body of the gas turbine engine, and an ejector portion defined between the circumferential edge of the turbine wheel and the adjacent edge of the stationary part of the gas turbine engine which ejector portion opens to a high temperature gas flow passage in which the turbine blades are operatively disposed at the base portion of the turbine blade. The turbine wheel and blade assembly is also provided with an additional cooling air flow passage at another one of the external surfaces thereof. The additional cooling air flow passage is comprised of a cooling air inlet formed in a rotational shaft driven by the turbine wheel, an intermediate passage defined between another side wall of the turbine wheel and adjacent side wall of another stationary part of the gas turbine engine, and an ejector portion defined between another circumferential edge of the turbine wheel and the adjacent edge of another stationary part of the gas turbine engine which ejector portion opens to the high-temperature gas flow passage at the opposing side of the base portion of the turbine blades.

These and other objects and features of the present invention will become more apparent from the following description taken in conjunction with the accompanying drawings in which.

Figure 1:
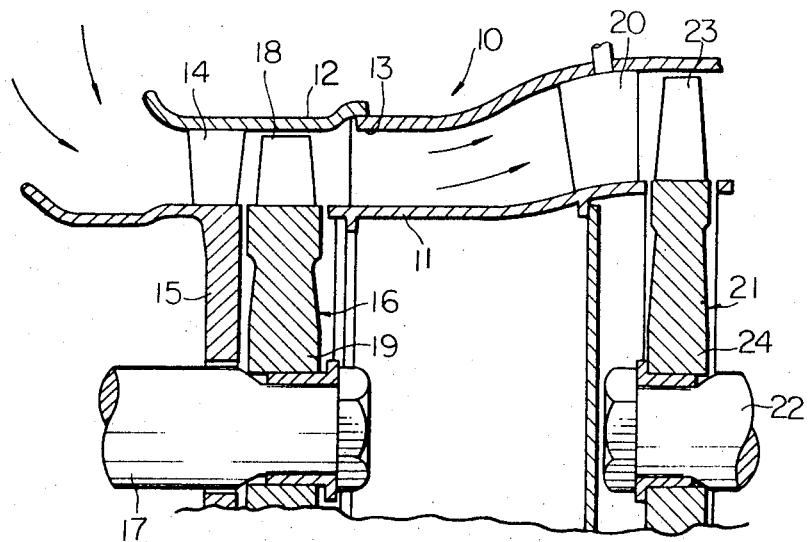
FIG. 1 is a sectional view of a conventional gas turbine engine with which the cooling system of the present invention is adapted to be used.

Referring now to FIG. 1, there is shown in section a conventional gas turbine engine to which the cooling system of the present invention is applied. The gas turbine engine, which is generally indicated by reference numeral 10, is comprised of an inner shroud 11 and an outer shroud 12, between which an annular high-temperature gas flow passage 13 is defined. The high-temperature gas flow passage 13 communicates with a combustion chamber (not shown) having suitable fuel distribution means therein. Fixed guide vanes or nozzle blades 14 are located in the high-temperature gas flow passage 13 for the directional control of the gases flowing therethrough. The nozzle blades 14 are mounted on a stator body or a hub member 15 integrally connected to the inner shroud 11.

A primary turbine wheel and blades assembly 16 is operatively located with the inner shroud 11 and is fixed to a compressor driving shaft 17 for rotation therewith. The turbine wheel 16 is provided with a plurality of circumferentially spaced blades 18 which extends radially outwardly of a wheel rim 19. The turbine blades 18 thus arranged are positioned within the confines of the outer shroud 12, as shown in FIG. 1.

Downstream of the turbine wheel 16, the gas turbine engine 10 is further provided with a plurality of radially directed guide vanes or nozzle blades 20 which are circumferentially spaced about the outer shroud 12 for the control of flow of gases therethrough.

A secondary turbine wheel and blade assembly 21 is disposed within the outer shroud 12 and is secured to a driven shaft 22. Likewise, the turbine wheel 21 is provided with a plurality of circumferentially spaced turbine blades 23 which extends radially outwardly of a wheel rim 24 of the turbine wheel 21.

The gases flow from the combustion chamber (not shown) through the nozzle blades 14 which accelerate and cause the gases to impinge upon the turbine blades 18 in a manner causing rotative motion of the turbine wheel 16 which, in turn, drives the compressor (not shown). The gases, continuing to flow toward an exhaust orifice (not shown) of the gas turbine engine, pass between the second set of guide vanes or nozzle blades 20, similar to the nozzle blades 14, which direct the gases against the turbine blades 23 of the output power turbine wheel or secondary turbine wheel 21 which is consequently rotated thereby.

With this construction, high-temperature driving gases flowing through the gas flow passage 13 are drawn to the cavities around the primary turbine wheel 16 and the secondary turbine wheel 21 to heat these members. These members are also subjected to centrifugal forces during rotation so that there is a marked increase in the deterioration of the wheel rims and the turbine blades of the turbine wheels.

To eliminate these drawbacks, the present invention contemplates to provide a cooling system wherein cooling air is introduced to the external surfaces of the turbine wheel and blade assembly of the gas turbine engine. Preferred examples of the cooling system implementing the present invention are shown in FIGS. 2 and 3, wherein like component parts are designated by the same numerals as used in FIG. 1.

Figure 2:
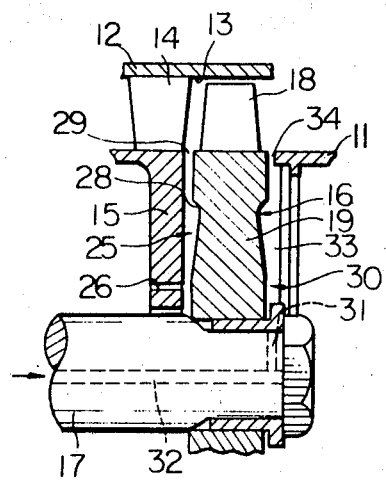
FIG. 2 is a sectional fragmentary view of a primary turbine wheel and blade assembly of the gas turbine engine of FIG. 1 in which the cooling system embodying the present invention is incorporated.
Figure 3:
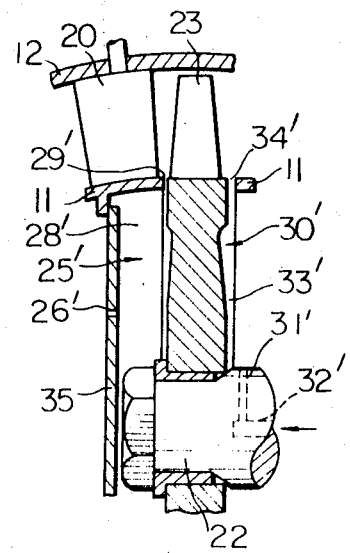
FIG. 3 is a sectional fragmentary view of a secondary turbine wheel and blade assembly of the gas turbine engine of FIG. 1 in which the cooling system of the present invention is incorporated.

As seen from FIG. 2, the cooling system of the present invention is comprised of a cooling air flow passage 25 which is provided on the external surface of the turbine wheel and blade assembly 16. The cooling air flow passage 25 consists of a cooling air inlet 26 which is formed in the radially inward portion of the stationary member or stator body 15 of the gas turbine engine. The cooling air inlet 26 is herein shown as being vented to the atmosphere but may be connected to a cooling air compressor (not shown), if desired.

The cooling air inlet thus constructed communicates with an intermediate passage 28 which is defined between one of the side walls of the turbine wheel 16 and the adjacent side wall of the stator body 15.

The cooling air flow passage 25 is further comprised of an ejector portion 29 which communicates with the intermediate passage 28 connected to the cooling air inlet 26. The ejector portion 29 is defined between the circumferentially outward edge (not identified) of the wheel rim 19 of the turbine wheel 16 and the adjacent edge of the stator body 15 in such a manner as to provide a cooling air outlet at the base portion of the turbine blades 18 during operation. More particularly, the ejector portion 29 may be preferably inclined toward the base portion of the turbine blades 18 so as to direct the cooling air thereto in a satisfactory fashion. This is attained by providing a sharp edge at the circumferential periphery of the stator body 15.

As shown in FIG. 2, an additional cooling air flow passage 30 is provided on the other side wall of the turbine wheel and blade assembly 16. In similar manner, the additional cooling air flow passage 30 is comprised of a cooling air inlet 31 which is formed in the compressor driving shaft 17. The cooling air inlet 31 is connected to a cooling air supply passage 32 which is formed in the axial portion of the compressor driving shaft 16. The cooling air supply passage 32 is connected to the cooling air compressor, though not shown, or may be designed to communicate with the atmosphere for receiving cooling air therefrom.

The cooling air inlet 31 is connected to an intermediate passage 33 which is formed between the side wall of the wheel rim 19 of the turbine wheel 16 and the adjacent side wall of the stationary part which is integrally connected to the inner shroud 11 of the gas turbine engine.

An ejector portion 34 is also provided in the additional cooling air flow passage 30 to direct the cooling air to the base portion of the turbine blades 18 of the turbine wheel 16. The ejector portion 34 is formed between the circumferentially outward edge of the wheel rim 19 of the turbine wheel 16 and the adjacent edge of the stationary part (not identified) integrally connected to the inner shroud 11 of the gas turbine engine.

As the turbine wheel 16 is rotated, the cooling air is drawn through the cooling air inlet 26 by the centrifugal force due to rotation of the turbine wheel 16 and directed into the intermediate passage 28. The cooling air thus introduced into the intermediate passage 28 is brought into contact with the external surface of the rim 19 of the turbine wheel 16 thereby transferring heat therefrom. Due to the centrifugal force caused by rotation of the turbine wheel 16, the cooling air in the intermediate passage 28 is also delivered to the ejector portion 29 and emanates therefrom into the high-temperature gas flow passage 13. The cooling air emanating from the ejector portion is caused to impinge upon the base portion of the turbine blades 18 by the action of flow of gases passing through the gas flow passage 13, thereby effectively cooling the base portion of the turbine blades 18. At the same time, the cooling air is supplied to the cooling air supply passage 32 from which the cooling air is supplied to the cooling air inlet 31. The cooling air thus supplied to the cooling air inlet 31 is drawn into the intermediate passage 33 by the centrifugal forces due to rotation of the turbine wheel 16 and brought into contact with the external surface of the wheel rim 19 which is consequently cooled. The cooling air in the intermediate passage 33 is also drawn to the ejector portion 34 in such a manner as previously discussed, from which the cooling air is forced to flow into the high-temperature gas flow passage 13 downstream of the turbine blades 18. Thus, the cooling is performed at the base portion of the turbine blades 18.

FIG. 3 illustrates an example of another application of the cooling system of the present invention, wherein like component parts have been assigned the same numerals with the exception that a prime (1) has been added to those, respectively. In this illustrated embodiment, the construction and operation of the cooling systems generally designated at 25' and 33' are the same as those disclosed in FIG. 2 and, therefore, the detailed description of the same is herein omitted for the sake of simplicity of illustration. It is to be noted, however, that in this illustrated embodiment, the cooling air inlets 26 are provided in a sealing plate designated at 35 and the driven shaft 22 instead of the stator body 15 and the compressor driving shaft 17, respectively.

Figure 4:
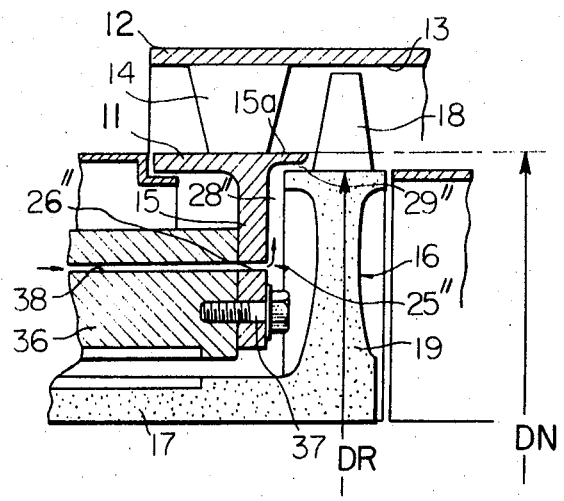
FIG. 4 is a sectional fragmentary view of the primary turbine wheel and blade assembly employing a modified form of the cooling system according to the present invention.

A modified form of the cooling system of the present invention is illustrated in FIG. 4, wherein the turbine wheel 16 is shown as integral with the compressor driving shaft 17 whereas the stator body 15 is shown as mounted on a bearing member 36 by means of a bolt 37 in which a cooling air supply passage is formed. In this modification, the outer diameter DR of the turbine wheel 16 is made smaller than the outer diameter DN of the outer shroud 12 or stator body 15 to provide a space or gap therebetween. As seen from FIG. 4, the stator body 15 is formed with an axially extending projecting portion 15a at its circumferentially outward edge thereof which forms the ejector portion 29'' in association with the peripheral wall of the turbine wheel 16. With this construction, the cooling air delivered to the ejector portion 29'' is caused to impinge upon the base of the turbine blades 18 in a film form thereby preventing the decrease in the performance efficiency of the gas turbine engine.

Figure 5:
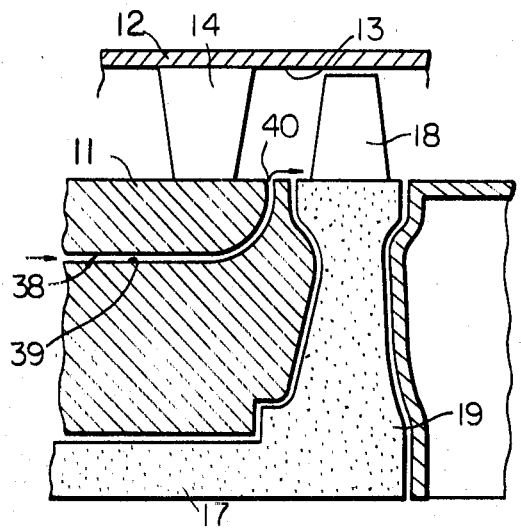
FIG. 5 is a sectional fragmentary view of the primary turbine wheel and blade assembly incorporating therein another modified form of the cooling system of the present invention.

FIG. 5 illustrates another modified form of the cooling system of the present invention in which a cooling air flow passage 38 is constructed in such a manner as to supply the cooling air only to the base portion of the turbine blades 18. For this purpose, a passage 39 is directly provided in the stator body 12 of the gas turbine enging, which passage 39 leads to an ejector portion 40 opening to the high-temperature gas flow passage 13 adjacent the base portion of the turbine blades 18.

It will now be appreciated that the cooling system of the present invention is capable of cooling the external surfaces of the turbine wheel and blade assembly of a gas turbine engine in a satisfactory fashion with a resultant increase in the useful life or durability of the gas turbine engine.

It will also be noted that the cooling system implementing the present invention is simple in construction and economical to manufacture with the use of a minimum number of component parts.

What is claimed is:

1. A cooling system for use in a gas turbine engine having a high-temperature gas flow passage, a turbine wheel and blade assembly, stator bodies adjacent said turbine wheel and blade assembly, and a compressor driving shaft operatively connected to said turbine wheel and blade assembly, said cooling system comprising, in combination, a cooling air flow passage having a cooling air inlet formed in one of said stator bodies of said gas turbine engine, an intermediate passage communicating with said cooling air inlet, said intermediate passage being defined between the side wall of the turbine wheel and the adjacent side wall of one of said stator bodies, and an ejector portion communicating with said intermediate passage and defined between one of the circumferential edges of the turbine wheel and the adjacent edge of said one of the stator bodies of said gas turbine engine, said ejector portion being inclined toward the base portion of said turbine blades and opening to said high-temperature gas flow passage adjacent the turbine blades of said assembly, and an additional cooling air flow passage having a cooling air inlet formed in said compressor driving shaft and communicating with a cooling air supply passage formed in said compressor driving shaft, an intermediate passage communicating with said cooling air inlet formed in said compressor driving shaft, said last-mentioned intermediate passage being defined between the other side wall of said turbine wheel and the side wall of the other one of said stator bodies, and an ejector portion communicating with said last-mentioned intermediate passage and defined between the other one of the circumferential edges of said turbine wheel and the adjacent edge of the other one of said stator bodies, said last-mentioned ejector portion opening to said high-temperature gas flow passage adjacent the turbine blades of said assembly.

* * * * *